United States Patent Office 2,890,218
Patented June 9, 1959

2,890,218

2,4-DIMETHYL-5-SULFANILAMIDOPYRIMIDINE

Otto Schnider and René Urban, Basel, Switzerland, assignors to Hoffmann-La Roche Inc., Nutley, N.J., a corporation of New Jersey No Drawing. Application November 16, 1956
Serial No. 622,544

Claims priority, application Switzerland
November 25, 1955

1 Claim. (Cl. 260—239.75)

This invention relates to 2,4-dimethyl-5-sulfanilamidopyrimidine.

2,4-dimethyl-5-sulfanilamidopyrimidine is useful as an antibacterial agent, e.g. in combatting infections of pneumococcal or streptococcal origin. This antibacterial agent may be administered orally in therapeutic doses, e.g. in conventional tablet form.

According to this invention acetamidine or a salt thereof is condensed with an α-(lower alkoxymethylene)-acetoacetic acid ester, the 2,4-dimethyl-5-pyrimidinecarboxylic acid ester thus produced is converted to 2,4-dimethyl-5-aminopyrimidine, the last named compound is reacted with a benzenesulfonyl halide, which bears in the para-position a group which may be readily converted into an amino group and the para-substitutent of the resultant phenylsulfonamidopyrimidine product is then converted into an amino group to obtain 2,4-dimethyl-5-sulfanilamidopyrimidine.

Acetamidine or a salt thereof, for example the hydrohalides and particularly the hydrochloride, may be used in the initial step of the process. The α-(lower alkoxymethylene)acetoacetic acid esters which are used as starting materials are obtained, for example, by reacting an acetoacetic acid lower alkyl ester with an orthoformic acid tri-lower alkyl ester. α-(ethoxymethylene)acetoacetic acid ethyl ester is preferred. The condensation of acetamidine or a salt thereof with the ester is effected in aqueous or alcoholic solution in the presence of an alkaline agent, for example sodium hydroxide, potassium carbonate, sodium carbonate, or an alkali metal alkoxide at room temperature. There is thereby formed, by ring closure, a 2,4-dimethyl-5-pyrimidinecarboxylic acid lower alkyl ester wherein the lower alkyl group corresponds to the lower alkyl group of the starting ester.

The conversion of the 2,4-dimethyl-5-pyrimidinecarboxylic acid lower alkyl ester into 2,4-dimethyl-5-aminopyrimidine, that is, the conversion of the carbalkoxy group in the 5-position into an amino group, is effected by utilizing the method of Hoffmann. The 2,4-dimethyl-5-pyrimidinecarboxylic acid lower alkyl ester is treated with ammoonia (e.g. a concentrated solution of ammonia in water or methanol) to obtain 2,4-dimethyl-5-pyrimidinecarboxamide. The carboxamide is then converted into the 2,4-dimethyl-5-pyrimidinecarbamic acid lower alkyl ester by treatment of the former with bromine and an alkali metal alkoxide, e.g. sodium methoxide, in alcoholic solution. The carbamic acid ester is hydrolyzed by means of a basic agent, e.g. alkali metal hydroxide or alkaline earth metal hydroxide, preferably sodium or barium hydroxide, to obtain 2,4-dimethyl-5-aminopyrimidine.

The 2,4-dimethyl-5-aminopyrimidine thus obtained is reacted with a benzenesulfonyl halide which is substituted in the para-position with a group which is easily converted to the amino group, for example an acylamino group or a nitro group. Preferred are p-nitrophenyl-sulfonyl chloride and p-acetaminophenylsulfonyl chloride. The reaction is preferably carried out in the presence of a basic acid-binding agent, for example pyridine or triethylamine. After this condensation, the para-substituent on the benzene ring is converted into the free amino group. The conversion to the amino group may be effected by reduction in the case of a nitro group or by saponification, preferably by means of an alkali such as sodium hydroxide, in the case of an acylamino group.

The following example is illustrative of the invention. All temperatures are expressed in degrees centigrade.

Example

A solution of 150 parts by weight of acetamidine hydrochloride in 150 parts by volume of water and 262 parts by weight of a α-(ethoxymethylene)acetoacetic acid ethyl ester was added to a solution of 410 parts by weight of potassium carbonate in 1200 parts by volume of water. The mixture was stirred about 5 to 6 hours at room temperature and permitted to stand overnight. The oil which separated was taken up in chloroform and the solution was washed twice with water. The solvent was evaporated and the residue was distilled at 113–117°/12 mm. 2,4-dimethyl-5-pyrimidinecarboxylic acid ethyl ester was obtained as a colorless liquid.

38 parts by weight of 2,4-dimethyl-5-pyrimidinecarboxylic acid ethyl ester were agitated with 40 parts by volume of concentrated ammonia until all the oil went into solution. 2,4-dimethyl-5-pyrimidinecarboxamide, M.P. 188–189°, crystallized from the solution. This acid amide was dissolved in 100 parts by volume of methanol and added to a sodium methoxide solution which was produced from 4 parts by weight of sodium and 130 parts by volume of methanol. 14 parts by weight of bromine were dropped into the solution and it was heated for 10 minutes on a water bath. The reaction mixture was then acidified slightly with acetic acid and evaporated to dryness. The residue was dissolved in chloroform and water, the chloroform solution was washed with a little water, dried with water-free sodium sulfate and the solvent was distilled off. 2,4-dimethyl-5-pyrimidinecarbamic acid methyl ester remained as a solid residue. This urethane is readily soluble in water and most solvents and melts at 102–103° after recrystallization from xylene. The carbamic acid ester was refluxed with 45 parts by weight of crystalline barium hydroxide and 120 parts by volume of water for 5 hours. The solution was then saturated with carbonic acid, separated from the precipitated barium carbonate and evaporated to dryness. The residue was distilled at 139–140°/16 mm. 2,4-dimethyl-5-aminopyrimidine was obtained as a solid substance which formed colorless crystals upon recrystallization from benzene, M.P. 107–108°. The slightly stable hydrochloride obtained therefrom melts at 180°.

19 parts by weight of p-acetaminophenylsulfonyl chloride were added to a solution of 10 parts by weight of 2,4-dimethyl-5-aminopyrimidine in 60 parts by volume of pyridine whereupon the temperature rose to 65°. The solution was heated at 70° for an additional 3 hours. Upon cooling, the major portion of the 2,4-dimethyl-5-($N^4$-acetylsulfanilamido)pyrimidine, M.P. 249–250°, which formed precipitated out and was separated by filtering under suction. By concentrating the mother liquor, dissolving the residue in 40 parts by volume of alcohol and seeding, an additional amount of the same compound crystallized. The compound was further purified by dissolving it in sodium hydroxide solution and precipitating with acetic acid.

32 parts by weight of 2,4-dimethyl-5-($N^4$-acetylsulfanilamido)pyrimidine were refluxed for one hour with 120 parts by volume of 2 N sodium hydroxide. The solution was cooled and acidified slightly with hydrochloric acid. 2,4-dimethyl-5-sulfanilamidopyrimidine separated. The crude material was purified by dissolving in an excess of dilute hydrochloric acid and adding sodium acetate solution whereupon the compound precipitated as shiny crystals. Upon recrystallization from 40 parts of ethyl alcohol, the 2,4-dimethyl-5-sulfanilamidopyrimidine formed colorless crystals melting at 237–239°.

We claim:
2,4-dimethyl-5-sulfanilamidopyrimidine.

References Cited in the file of this patent

UNITED STATES PATENTS

| | | |
|---|---|---|
| 2,111,913 | Kamlet | Mar. 22, 1938 |
| 2,351,333 | Gysin | June 13, 1944 |
| 2,377,395 | Andersag et al. | June 5, 1945 |
| 2,521,096 | Richmond | Sept. 5, 1950 |
| 2,624,732 | Hitchings | Jan. 6, 1953 |
| 2,680,740 | Jacob | June 8, 1954 |
| 2,693,466 | Evans et al. | Nov. 2, 1954 |

FOREIGN PATENTS

| | | |
|---|---|---|
| 555,865 | Great Britain | Sept. 10, 1943 |

OTHER REFERENCES

Karrer: Organic Chemistry, 2nd English ed., Elsevier Publishing Co., p. 795.

Backer et al.: Rec. Trav. Chim., vol. 61, pp. 291–298 (1942).

Marshall: Journal of the Chemical Society, 1951, Part II, pp. 1004–1016.

Rose: Journal of the Chemical Society, 1952, Part 3, pp. 3448–3463.

Boarland et al.: J. Chem. Society, 1951, Part II, pp. 1218–1220.

Shriner et al.: Chemical Review, vol. 35, pp. 395 to 403 (1944).